United States Patent [19]
Pressley

[11] Patent Number: 5,504,968
[45] Date of Patent: Apr. 9, 1996

[54] ABSORBENT MEDIA CIRCULATING APPARATUS

[75] Inventor: David Pressley, Greer, S.C.

[73] Assignee: Michelin Recherche et Technique S.A., Granges-Paccot, Switzerland

[21] Appl. No.: 275,205

[22] Filed: Jul. 14, 1994

[51] Int. Cl.⁶ ............................... A47L 7/00; G01M 17/02
[52] U.S. Cl. .............................................. 15/302; 73/146
[58] Field of Search ..................... 15/302, 320; 73/146

[56] References Cited

U.S. PATENT DOCUMENTS

| | | | |
|---|---|---|---|
| 1,487,062 | 3/1924 | Hohl | 15/302 |
| 2,766,618 | 10/1956 | Stieler et al. | 73/146 |
| 2,814,825 | 12/1957 | Guthrie, Jr. et al. | 15/302 |
| 2,837,759 | 6/1958 | Haverberg | 15/302 |
| 4,272,301 | 6/1981 | Galbraith et al. | 15/302 |
| 4,458,527 | 7/1984 | McFarland et al. | 73/146 |

FOREIGN PATENT DOCUMENTS

| | | | |
|---|---|---|---|
| 302488 | 2/1989 | European Pat. Off. | 73/146 |
| 2611123 | 3/1976 | Germany | 73/146 |
| 36802 | 4/1978 | Japan | 73/146 |
| 191658 | 11/1983 | Japan | 15/302 |
| 1589103 | 8/1990 | U.S.S.R. | 73/146 |

*Primary Examiner*—David Scherbel
*Assistant Examiner*—Tony G. Soohoo
*Attorney, Agent, or Firm*—Russell W. Warnock

[57] ABSTRACT

A powder circulating apparatus provides a closed loop system for delivering an absorbent media to an area adjacent a tire at which wearing of the tire surface is occurring, conveying away the absorbent media and those materials absorbed by or entrained with the absorbent media, and recirculating the absorbent media to the tire adjacent area. The apparatus advantageously permits the delivery of the absorbent media from one of a pair of spray locations so as to take advantage of the air flow adjacent the tire due to the direction of the rotation of the tire.

3 Claims, 3 Drawing Sheets

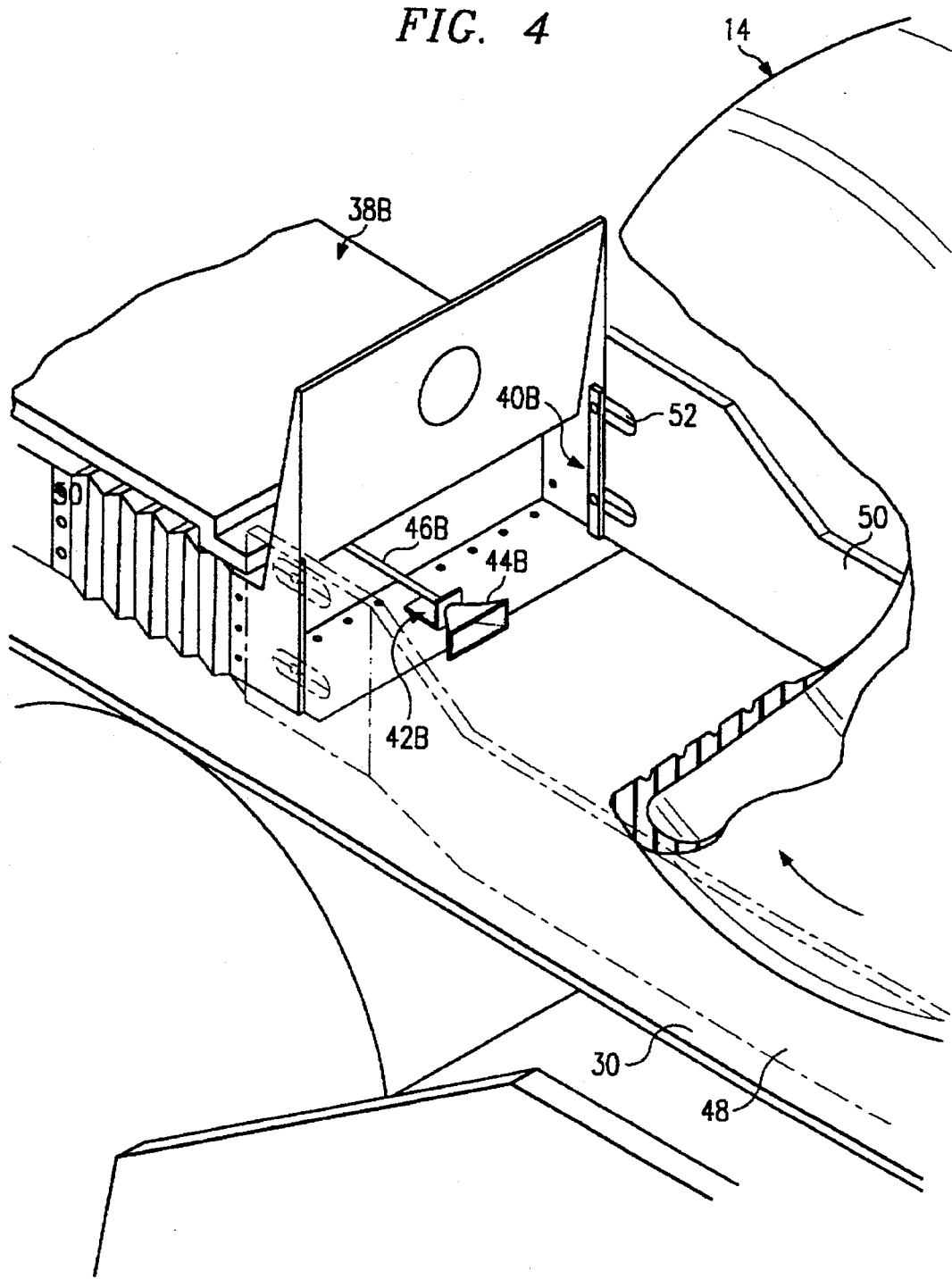

ABSORBENT MEDIA CIRCULATING APPARATUS

BACKGROUND OF THE INVENTION

The present invention relates to a powder circulation apparatus for circulating an absorbent media in the vicinity of a tire being subjected to wearing conditions such that the absorbent media entrains materials released from the tire and for conveying away the absorbent media and entrained released material.

A conventional pneumatic tire found on a passenger or truck vehicle is comprised of elastomeric materials such as, for example, cured rubber products. When the pneumatic tire is mounted on a vehicle, the tire is subjected to wearing during its rotation along a surface and is subjected to cyclic compressive and tensile forces. Due to such loading and wearing, particles are worn from the tire tread surface and, as well as, liquid-type materials are "secreted" or otherwise released.

Under typical, actual use conditions such as travel of the tire along a road surface, such released particles are immediately dispersed away from the tire and, accordingly, have negligible if not even virtually undetectable influence on the tire performance. However, there are other circumstances in which such material released from a tire may interfere with or mask the performance of the tire or hinder the acquisition of data concerning the tire. For example, tire manufacturers often test sample tires of a tire product line to thereby evaluate the tire's performance under anticipated or extreme load conditions or to detect manufacturing problems and such testing is often conducted on specialized tire test machines which rotate the tested tire at actual travel speeds while the tire is loaded by a rotating load wheel or endless belt. In such circumstances, the tire being tested does not undergo any translatory movement—e.g., the tire is simply rotated in contact with the load wheel or the endless belt at the same fixed reference contact area. The solid particles and liquid material released from the tire in such a situation tend to accumulate and circulate around the contact area and thereby hinder or falsely influence the test results.

One proposed solution for handling such released material is to introduce an absorbent powder or desiccant adjacent the tire which adheres to or absorbs the released material, thus creating particles of greater mass which fall onto a surface adjacent the tire contact area or disperse under the influence of the air currents moving around the rotating tire. These deposited particles, once clear of the tire contact area, then no longer unduly interfere with or hinder the acquisition of measurements of the tire and, also, such deposited particles are no longer susceptible to re-adhere to the tire tread surface and thereby falsely influence the tire measurement. However, the need still exists for an apparatus which effectively delivers such absorbent powder and which reliably removes the released materials from the tire contact area.

SUMMARY OF THE INVENTION

The present invention provides an apparatus which effectively delivers an absorbent media adjacent a tire to entrain released materials and which reliably removes the released materials. According to one aspect of the present invention, there is provided an apparatus for conveying away selected material released from a tire during contact of the tire with a medium which works the tire surface which subsequently remains in a debris area adjacent the tire. The apparatus includes means for disposing an entrainment media in the debris area substantially contemporaneously with further working of the tire surface and means for conveying the entrainment media and the released material entrained therewith from the debris area to a discharge location at which the entrained released material is discharged. The entrainment media has the characteristic of promoting entrainment therewith of the released selected material for subsequent conveyance of both the entrainment media and the entrained released material away from the debris area.

According to one feature of the one aspect of the present invention, the disposing means includes a movable assembly which is movable to a plurality of positions relative to the debris area for disposing entrainment media from each respective position into the debris area.

Preferably, the disposing means includes means for jetting a stream of entrainment media into the debris area. Also, the conveying means includes means for applying suction at the debris area.

In accordance with one preferred configuration of the one aspect of the present invention, the apparatus includes means for separating the entrainment media and the entrained selected material into separate streams upstream of the discharge location and means for subsequently directing the stream of separated released material into the discharge location. Additionally, the apparatus in this preferred configuration preferably includes means interconnecting the separating means and the disposing means for passage of entrainment media from the separating means to the disposing means for recirculation of the entrainment media into the debris area whereby the entrained media circulates in a closed loop system.

According to further details of this preferred configuration of the apparatus, the disposing means includes a first jetting means for directing a stream of entrainment media into the debris area from a first location, a second jetting means for directing a stream of entrainment media into the debris area from a second location, and means for controlling at least one of the first and second jetting means to direct a stream of entrainment media into the debris area, and the conveying means includes a first suction applying assembly for applying suction at the debris area, a second suction applying assembly for applying suction at the debris area, and means for controlling at least one of the first and second suction applying assemblies to apply suction at the debris area. Moreover, the first jetting means and the first suction applying assembly are coupled to one another for coordinated movement together as a single unit and the second jetting means and the second suction applying assembly are coupled to one another for coordinated movement together as a single unit and further comprising means for controlling a selected one of the jetting means and the respective suction applying assembly associated with the other jetting means to operate simultaneously whereby the selected jetting means-disposes entrainment media at the debris area and the respective suction applying assembly applies suction at the debris area to convey the entrainment media and entrained selected material away from the debris area.

According to another feature of the one aspect of the present invention, in a situation in which the tire and the working medium are movable relative to one another to thereby change their relative orientations to each other and, consequently, to change the relative location of the debris area, the apparatus may additionally include means for repositioning the movable assembly for selectively varying the location at which the entrainment media is introduced into the debris area.

According to another aspect of the present invention, an apparatus is provided for use with a tire testing machine for conveying away selected material released from a tire during contact of the tire with a medium which works the tire surface which subsequently remains in a debris area adjacent the tire provided. The apparatus includes means for disposing an entrainment media in the debris area substantially contemporaneously with further working of the tire surface, the entrainment media having the characteristic of promoting entrainment therewith of the released selected material for subsequent conveyance of both the entrainment media and the entrained released material away from the debris area and means for conveying the entrainment media and the released material entrained therewith from the debris area to a discharge location at which the entrained released material is discharged.

BRIEF DESCRIPTION OF THE DRAWINGS

FIG. 4 is an enlarged perspective view of the rearward duct subassembly of the powder circulation apparatus and showing the duct outlet in a partially advanced position relative to the debris area.

DETAILED DESCRIPTION OF THE PREFERRED EMBODIMENT

As seen in FIGS. 1–4, the preferred embodiment of the powder circulation apparatus 10 of the present invention is illustrated in detail. For the sake of illustration, the powder circulation apparatus 10 will be hereinafter discussed in connection with its installation and operation on a tire test machine of the endless belt type, but it is to be understood that the powder circulation apparatus of the present invention is designed for effectively removing certain materials released from a tire due to wearing of the tire surface and, thus, its utility extends not only to tire test machines but, as well, to any other type of machine or process in which a tire's surface is worn, abraded, ground, or otherwise subjected to those types of forces which cause material to be released from the tire. Moreover, the powder circulation apparatus 10 finds utility in applications involving a wide range of tires, be they pneumatic or non-pneumatic tires and tire of all sizes or destined for a variety of vehicles such as, for example, passenger automobiles, trucks, aircraft, or heavy equipment.

Figure 1:
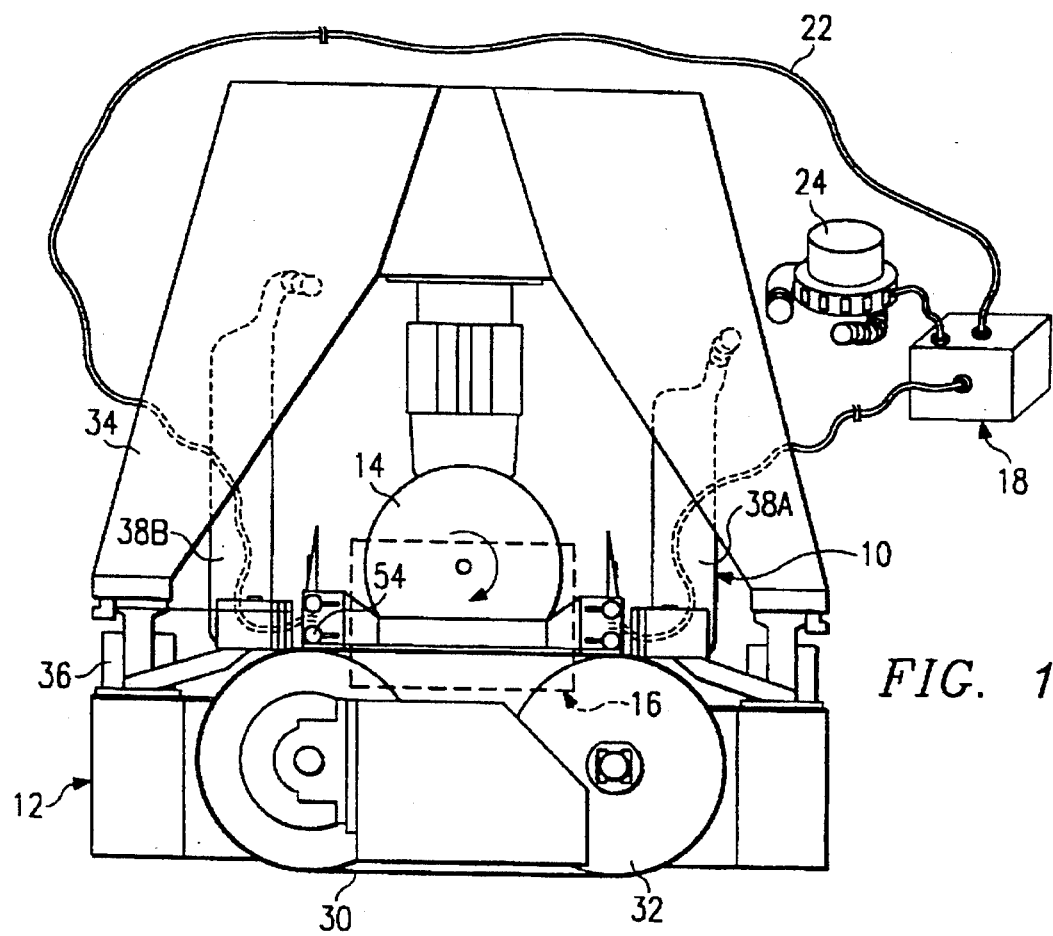
FIG. 1 is a front elevational view of a tire test machine having the preferred embodiment of the powder circulation apparatus of the present invention installed thereon.

As seen in FIGS. 1 and 4, the powder circulation apparatus 10 is installed on an endless belt-type tire test machine 12 and is operable to facilitate the dispersal and removal of selected materials which come off or are released from a tire 14 during testing by the tire test machine 12. The powder circulation apparatus 10 removes the selected materials from a region adjacent the tire, hereinafter designated as the debris area 16, in which these materials would otherwise tend to circulate and accumulate and thus detrimentally affect the acquisition of desired measurements during tire testing. Likewise, if the tire is instead being subjected to handling in a situation other than on the test machine 12, such as, for example, a grinding operation to reconfigure the tire surface, the accumulation and circulation of the released materials may detrimentally interfere with the accuracy and efficiency of the grinding operation.

The types of material released from the tire 14 which the powder circulation apparatus 10 removes from the debris area 16 typically includes elastomeric particles which are of such size and weight as to resist being discharged from the debris area 16 under the action of the air currents generated by the movement of the tire 14 or the moving components of the tire test machine 12 yet of insufficient size and weight as to be deposited by action of gravity on surfaces of the tire test machine 12 away from the debris area 16. Typically, these elastomeric particles are maintained in an overall airborne status adjacent the contact area at which the surface of the tire 14 is in contact with one or more moving surfaces of the tire test machine 12 (such as, e.g., a moving endless belt) and, while these airborne elastomeric particles may occasionally alight on various surfaces adjacent the contact area such as, for example, the surface of the tire 14, they do not tend to remain on such surfaces. These elastomeric materials may be in solid, liquid-solid, or liquid states and, thus, may comprise particles of the tread of the tire 14 which have been abraded, chipped, cut, or otherwise physically released from the tire 14 during the tire test operation or may comprise droplets whose source is some of the petroleum-based raw materials from which the elastomeric material of the tire is formed. These petroleum-based materials are often "secreted" from the tire 14 due to the heat generated in the tire and the pressure applied against and within the tire during the tire test process and this process is commonly known as pyrolysis.

The powder circulation apparatus also conveys away other material released from a tire such as oils, extenders, and other materials used in tire compounds which may migrate to the surface of the tire as well as rubber particles released from the tire. Additionally, the powder circulation apparatus conveys away material released from a surface which is in contact with the tire such as abrasive material from the test machine surface. While the powder circulation apparatus 10 is suitable for removing certain materials released from a tire (and, additionally, from the contact surfaces of the test machine itself), the powder circulation apparatus 10 is particularly designed to remove such materials in a manner which does not interfere with the ongoing testing and measurement of the tire itself such as, for example, the continuous or periodic measurement of various lateral, vertical, or longitudinal forces experienced by the tire. To this end, the powder circulation apparatus 10 effectively accomplishes removal of the released or secreted materials without significantly altering or influencing the test conditions and without adversely affecting the maintenance and operation of the tire test machine itself. The powder circulation apparatus 10 accomplishes the efficient removal of the released material circulating in, or deposited at, the debris area 16 by circulating an entrainment media such as absorbent powder in a closed loop system in which the entrainment media contact and entrain the released material in the debris area 16, conveying away the entrained released material to a discharged location at which the entrained released material is discharged, and recirculating the entrainment media to the debris area 16 for the repeated entrainment and conveying away from other released material at the debris area 16.

Figure 2:
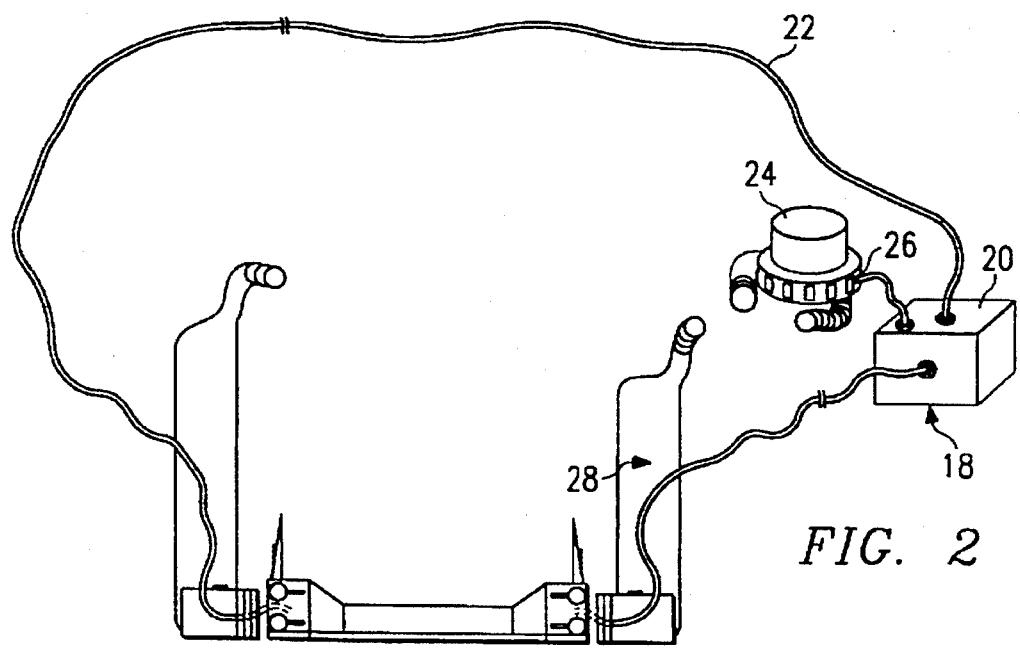
FIG. 2 is a front elevational view of the preferred embodiment of the powder circulation apparatus shown in FIG. 1.

FIG. 1 illustrates the powder circulation apparatus 10 in its installed disposition on the tire test machine 12 while FIG. 2 illustrates the powder circulation apparatus in isolation. For ease of clarity in the following discussion, the term "frontward" refers to an arbitrarily chosen direction corresponding to the direction in which the tire 14 would travel if it were rotated in a clockwise direction and the term "rearward" is the respective direction which is opposite to the particular "frontward" direction under discussion.

The powder circulation apparatus 10 includes a means for disposing an entrainment media in the debris area 16 substantially contemporaneously with ongoing working of the surface of the tire 14 and this entrainment media disposing means is preferably in the form of a powder delivery assembly 18 which includes a powder feed unit 20, a plurality of feed lines 22, and a means of jetting a stream of powder into the debris area 16. The powder circulation apparatus 10 also includes means for conveying the entrainment media and the released material entrained therewith from the debris area 16 to a discharge location at which the entrained released material is discharged. This conveying means preferably includes a suction motor 24, a filter unit 26 operably connected to the suction motor 24, and a duct assembly 28.

With reference now to FIG. 1, further details of the powder circulation apparatus 10 will be described in connection with their installed configuration on the tire test machine 12 and their cooperative operation therewith. The tire test machine 12 includes an endless belt 30 entrained around a pair of rollers 32 which drive the endless belt 30 in a selected clockwise or counterclockwise direction and thereby drive the tire 14 in contact with the endless belt 30 in an opposed clockwise or counterclockwise direction. The tire 14 is rotatably mounted to a frame assembly 34 of the tire test machine 12 and the frame assembly 34 is movable to selectively shift the tire 14 between a contact position in which the tire is in driven contact with the endless belt 30 and an out-of-contact position in which the tire is spaced from the endless belt 30. Additionally, the frame assembly 34 is operable to selectively vary the camber, the steer angle, and the vertical reactive force of the tire 14 as the tire is rotated due to the action of the endless belt 30 thereagainst. The tire test machine 12 thus described is of conventional design and operation and may be purchased commercially.

The frame assembly 34 of the tire test machine 12 is pivotally mounted on a pair of pivot assemblies 36 which enable the frame assembly to vary the camber of the tire 14 mounted on the assembly by pivoting of the frame assembly 34 about the pivot assemblies 36. To accommodate this pivoting movement of the frame assembly 34, the duct assembly 28 of the powder circulation apparatus 10 includes a frontward duct subassembly 38A and a rearward duct subassembly 38B each of which is mounted on the frame assembly 34 for movement therewith and each of which interconnects the suction motor 24 (and the associated filter 26) with other components of the duct assembly 28 which operate adjacent the debris area 16.

The duct subassemblies 38A, 38B includes segments constructed of suitable conventional duct material such as, for example, aluminum or metal skinned wire coils or rigid metal ducts which form channels of a selected cross-sectional area for handling a flow of entrainment media such as absorbent powder and entrained materials conveyed away from the debris area 16 at a desired cubic feet/minute rate of flow. Also, as will be described in further detail below, each of the duct subassemblies 38A, 38B operates to channel a flow of powder from the powder feed unit 20 to the debris area 16.

Figure 3:
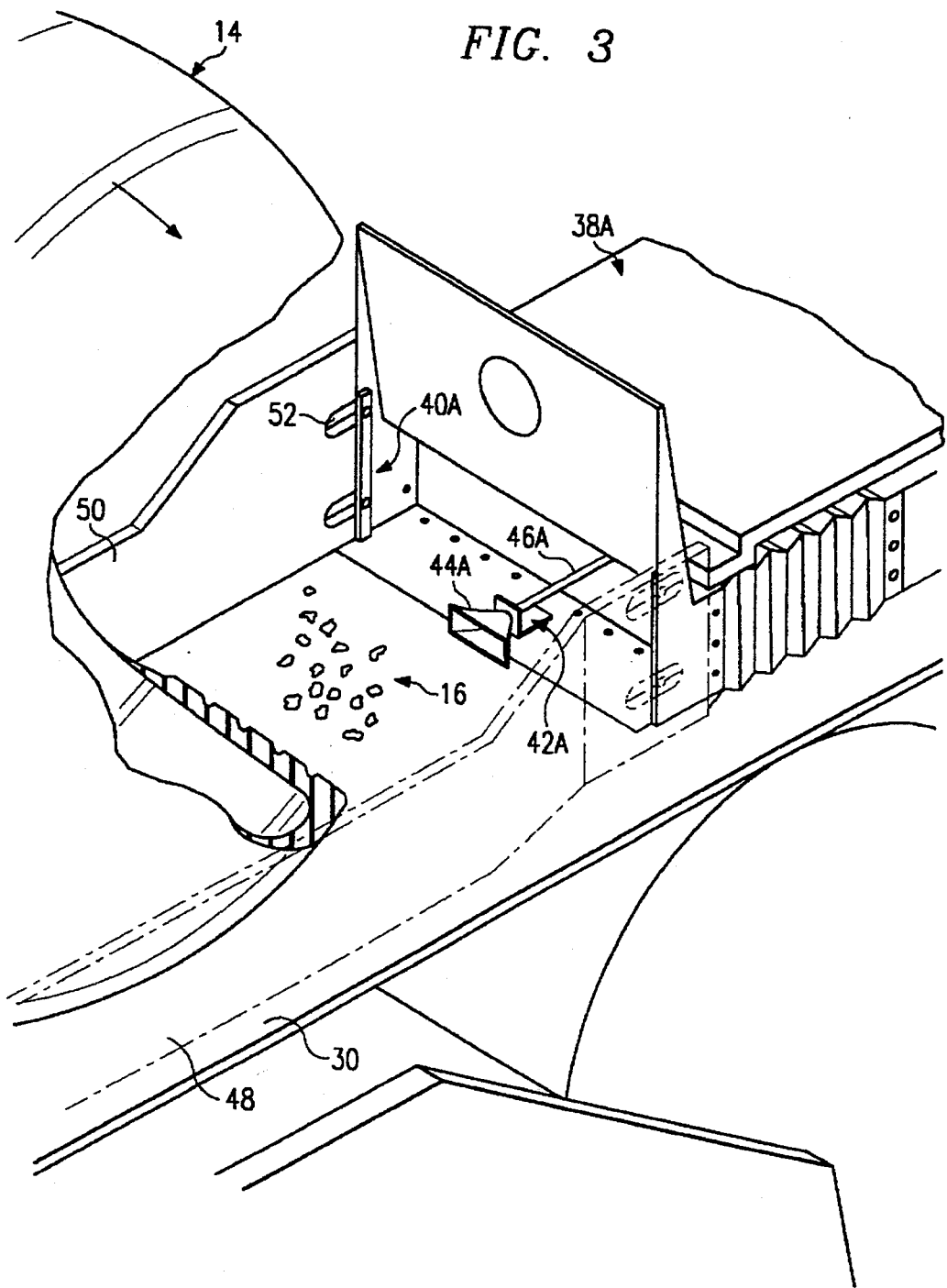
FIG. 3 is an enlarged perspective view of the frontward duct subassembly of the powder circulation apparatus and showing the duct outlet in a partially advanced position relative to the debris area.

As seen in FIG. 3, the duct subassembly 38A includes an outlet end portion 40A which forms an opening into the channel of the duct subassembly 38A through which powder and material released from the tire and entrained with the powder enters into the channel of the duct subassembly for transport therethrough to the suction motor 24 due to the suction action applied by the suction motor. Additionally, the end portion 40A supports a means for jetting a stream of entrainment media such as powder into the debris area 16 and this jetting means is preferably in the form of a jet nozzle assembly 42A comprising a nozzle head 44A and a conduit 46A fluidly interconnecting the nozzle head 44A and the powder feed unit 20 for the supply of powder to the spray head 44A under pressure.

The powder supplied from the powder feed unit 20 may be, for example, a corn starch-based powder having particles on which the released materials agglomerate or may be any one of the commercially available talc powders. While the preferred embodiment of the powder circulating apparatus 10 is configured to spray a dry powder, the present invention contemplates that a wetted powder or other liquid based absorbent media may be equally efficacious under some circumstances. In this regard, the term "entrainment media" as used herein is intended to refer to any suitable medium with the characteristic of effecting attachment of released materials thereto and is not limited to those media which may effect such attachment by absorption or adsorption.

The nozzle head 44A is supported centrally on a lower plate of the end portion 40A of the duct subassembly 38A and is oriented for dispersing a stream of powder into the debris area 16 generally parallel to the longitudinal centerline of the endless belt 30 of the tire test machine 12. The relative spacing between the nozzle head 44A and the debris area 16 can be selectively varied by repositioning of the end portion 40A of the duct subassembly 38A. To accomplish such repositioning of the end portion 40A relative to the debris area 16, the powder circulation apparatus 10 includes means for repositioning the duct subassembly 38A for selectively varying the location at which the entrainment media is introduced into the debris area 16 and this repositioning means preferably includes a pair of debris containment walls 48, 50, each extending longitudinally on a respective side of the tire 14 adjacent the endless belt 30 between the end portions 40A of the duct subassemblies 38A, 38B.

The debris containment walls 48, 50 cooperate to retain the material released from the tire 14 within a confined area having a width less than the lateral width of the endless belt 30 to thereby facilitate the operation of the powder circulation apparatus 10 and introducing powder into the debris area 16 and conveying away powder and entrained released material from the debris area, as will be described in more detail below. Each of the debris containment walls 48 50 includes a pair of longitudinally extending adjustments 52 formed at each respective longitudinal end of the debris containment wall, as seen in FIG. 3. As seen in FIG. 1, an adjustment set bolt 54 is associated with each adjustment slot 52 and is threadably retained in a threaded bore formed in one of the end portions 40A, 40B. Thus, each end portion 40A, 40B is selectively repositionable longitudinally toward or away from the debris area 16 by loosening the respective adjustment set bolts 54 threadably retained by the end portion, longitudinally shifting the end portion toward or away from the debris area 16 (during which movement the adjustment set bolts 54 move relatively within their respective adjustment slots 52), and re-tightening of the adjustment set bolts 54 once the end portion has been disposed at its new location.

As seen in FIG. 4, the duct subassembly 38B includes an outlet end portion 40B which forms an opening into the channel of the duct subassembly 38B through which powder and material released from the tire and entrained with the powder enters into the channel of the duct subassembly for transport therethrough to the suction motor 24 due to the suction action applied by the suction motor. Additionally, the end portion 40B supports a means for jetting a stream of entrainment media such as powder into the debris area 16 and this jetting means is preferably in the form of a jet nozzle assembly 42B comprising a nozzle head 44B and a conduit 46B fluidly interconnecting the nozzle head 44B and the powder feed unit 20 for the supply of powder to the nozzle head 44B under pressure.

The nozzle head 44B is supported centrally on a lower plate of the end portion 40B of the duct subassembly 38B and is oriented for dispersing a stream of powder into the debris area 16 in an overall direction parallel to the longitudinal centerline of the endless belt 30 of the tire test machine 12. The relative spacing between the nozzle head 44B and the debris area 16 can be selectively varied by repositioning of the end portion 40B of the duct subassembly 38B.

The filter unit 26 may be configured in the form of a conventional, commercially available filter element adapted to filter materials conveyed thereto by a suction-type motor such as the suction motor 24. For example, the filter unit 26 may be a cyclone-type filter in which particles of above a predetermined size (such as, e.g., the entrained selected material) are flung radially outwardly and other particles (such as, e.g., the absorbent powder) which are relatively uninfluenced by centrifugal forces are not flung radially outwardly but, instead, pass through the filter to be recirculated. U.S. Pat. No. 4,885,817 to Tanase discloses another suitable conventional filter arrangement which operates to separate entrained matter from a stream.

The powder circulating apparatus 10 operates as follows to convey released material away from the debris area 16. Absorbent powder is delivered under pressure from the powder feed unit 20 to a selected one of the nozzle heads 44A, 44B and the selected nozzle head sprays the powder into the debris area 16. The particular one of the nozzle heads 44A, 44B selected to spray the powder is typical chosen in consideration of the direction of rotation of the tire 14 so as to take advantage of the angularly moving air currents driven by the rotating tire. For example, as shown in FIG. 3, if the tire 14 is being rotated in a clockwise direction, the nozzle head 44A may be chosen to spray the powder into the debris area 16 so that the powder is introduced adjacent the tire in a direction which is complementary to the tangential directions of movements of the portions of the tire surface rotated through the debris area 16.

The respective end portion 40A, 40B associated with the non-spraying nozzle head 40A, 40B—in the present example, the end portion 40B associated with the non-spraying nozzle head 44B—is operated to apply suction to the area bounded by the containment walls 48, 50 so as to convey away the powder sprayed into the debris area 16 as well as any released material which has agglomerated with the powder or has otherwise become entrained with the powder. Suction is through the end portion 40B by operation of the suction motor 24 to draw suction through the suction channel formed by the rearward duct subassembly 38B.

The powder and entrained released material suctioned away from the debris area 16 flows through the outlet opening of the end portion 40B and thereafter along the suction channel of the rearward duct subassembly 38B into the filter unit 26. The filter unit 26 separates the entrained released material from the powder and deposits the separated material into a discharge area which may be, for example, a collection bag. The powder flowing through the filter unit 26 is delivered to the powder feed unit 20 for subsequent recirculation to the debris area 16.

If the tire 14 is instead being rotated in a counterclockwise direction as view in FIG. 3, then the nozzle head 44B can be operated to spray powder into the debris area, as seen in FIG. 4, while the frontward duct subassembly 38A is operated to apply suction for conveying away powder and entrained material.

The powder circulating apparatus 10 thus provides a closed loop system for delivering an absorbent media to an area adjacent a tire at which wearing of the tire surface is occurring, conveying away the absorbent media and those materials absorbed by or entrained with the absorbent media, and recirculating the absorbent media to the tire adjacent area. Moreover, the apparatus advantageously permits the delivery of the absorbent media from one of a pair of spray locations so as to take advantage of the air flow adjacent the tire due to the direction of the rotation of the tire.

I claim:

1. In a tire testing machine of the type having an endless belt trained around a pair of spaced apart rollers for driving movement along an axis, the endless belt contacting the tread of a tire between a forward end and a rearward end of the endless belt relative to the run of the endless belt as the endless belt is driven along the axis, and an assembly for supporting a tire to be tested in contact with the endless belt, an apparatus for conveying away material released from a tire during contact thereof with the endless belt, comprising:

a first combination assembly including a first jetting means for disposing an entrainment media in a debris area at which the tire and the endless belt are in contact with one another, the entrainment media promoting entrainment therewith of the released material for subsequent conveyance of both the entrainment media and the entrained released material away from the debris area, the first jetting means being positioned at the forward end of the endless belt, and a first suction applying means for conveying the entrainment media and the released material entrained therewith from the debris area to a discharge location at which the entrained released material is discharged, the first suction applying means being positioned at the forward end of the endless belt;

a second combination assembly including a second jetting means for disposing entrainment media in the debris area, the second jetting means being positioned at the rearward end of the endless belt, and a second means for conveying the entrainment media and the released material entrained therewith from the debris area to the discharge location, the second conveying means being positioned at the rearward end of the endless belt;

first and second sidewall members extending between the first combination assembly and the second combination assembly, the first and second sidewall members opposing one another and cooperating with the first and second combination assemblies to confine the released material and the entrainment media; and means for controlling the first jetting means in combination with the second suction applying means or controlling the second jetting means in combination with the first suction applying means to effect the delivery of entrainment media to the debris area simultaneous with the application of suction to the debris area, whereby the material released from the tire is entrained by the entrainment media and entrained released material is conveyed away from the debris area.

2. An apparatus according to claim 1 wherein the first combination assembly includes an adjustment sub-assembly for adjustably moving the first combination assembly to a plurality of positions relative to the debris area to thereby vary the disposition of entrainment media into the debris area.

3. An apparatus according to claim 2 wherein the second combination assembly includes an adjustment sub-assembly for adjustably moving the second combination assembly to a plurality of positions relative to the debris area to thereby vary the disposition of entrainment media into the debris area.

\* \* \* \* \*